(12) United States Patent
Ni et al.

(10) Patent No.: US 9,990,746 B2
(45) Date of Patent: Jun. 5, 2018

(54) DATA VISUALIZATION METHOD AND APPARATUS

(71) Applicant: Huawei Technologies Co., Ltd., Shenzhen (CN)

(72) Inventors: Bing Ni, Hong Kong (HK); Mingxuan Yuan, Hong Kong (HK); Huamin Qu, Hong Kong (HK)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 15 days.

(21) Appl. No.: 15/090,737

(22) Filed: Apr. 5, 2016

(65) Prior Publication Data

US 2016/0217600 A1 Jul. 28, 2016

Related U.S. Application Data

(63) Continuation of application No. PCT/CN2015/072536, filed on Feb. 9, 2015.

(30) Foreign Application Priority Data

Jul. 11, 2014 (CN) .......................... 2014 1 0329292

(51) Int. Cl.
*G06T 11/00* (2006.01)
*G06T 11/20* (2006.01)
(Continued)

(52) U.S. Cl.
CPC ............ *G06T 11/206* (2013.01); *G06F 17/30* (2013.01); *G06Q 10/101* (2013.01); *G06Q 50/01* (2013.01);
(Continued)

(58) Field of Classification Search
None
See application file for complete search history.

(56) References Cited

U.S. PATENT DOCUMENTS 8,296,667 B2 10/2012 Tewari et al.
2009/0037848 A1 2/2009 Tewari et al.
(Continued)

FOREIGN PATENT DOCUMENTS

CN 101719166 A 6/2010
CN 102591924 A 7/2012
(Continued)

OTHER PUBLICATIONS

Daisy Manual 2003, Jan. 2003, James Miller Daisy Analysis Ltd. Newmarket, Suffolk CB8 9LU, United Kingdom.*
(Continued)

*Primary Examiner* — Maurice L McDowell, Jr.
*Assistant Examiner* — Donna J Ricks
(74) *Attorney, Agent, or Firm* — Conley Rose, P.C.

(57) ABSTRACT

A data visualization method includes acquiring a spatiotemporal behavior data set generated by network users, determining, according to a time point at which or a time period in which each piece of spatiotemporal behavior data is generated, an amount of spatiotemporal behavior data that is in the spatiotemporal behavior data set and generated at a time point or in a time period falling within each time period in N time periods, and presenting a column bar corresponding to an $i^{th}$ time period in the N time periods, where the column bar is in a radial direction of a first circle representing a full time domain and intersects the first circle and the length of a column bar represents a quantity of behaviors in a time period corresponding to the column bar.

17 Claims, 5 Drawing Sheets

(51) Int. Cl.
*G06T 11/60* (2006.01)
*G06F 17/30* (2006.01)
*H04L 29/08* (2006.01)
*G06Q 10/10* (2012.01)
*G06Q 50/00* (2012.01)

(52) U.S. Cl.
CPC ............ *G06T 11/001* (2013.01); *G06T 11/60* (2013.01); *H04L 67/22* (2013.01)

(56) References Cited

U.S. PATENT DOCUMENTS

| | | |
|---|---|---|
| 2009/0262131 A1 | 10/2009 | Suntinger et al. |
| 2012/0102419 A1 | 4/2012 | Mital et al. |
| 2012/0151399 A1 | 6/2012 | Soerensen et al. |
| 2012/0197724 A1* | 8/2012 | Kendall ............ G06Q 30/0261 705/14.58 |
| 2013/0046772 A1 | 2/2013 | Gu et al. |
| 2013/0091465 A1 | 4/2013 | Kikin-Gil et al. |
| 2013/0249917 A1 | 9/2013 | Fanning et al. |
| 2013/0345978 A1* | 12/2013 | Lush ...................... G01C 21/00 701/533 |
| 2014/0184604 A1* | 7/2014 | Bak ...................... G06T 11/206 345/440 |

FOREIGN PATENT DOCUMENTS

| | | |
|---|---|---|
| CN | 102609966 A | 7/2012 |
| CN | 102929609 A | 2/2013 |
| CN | 103460233 A | 12/2013 |

OTHER PUBLICATIONS

Foreign Communication From a Counterpart Application, European Application No. 15818680.9, Extended European Search Report dated Sep. 1, 2016, 10 pages.
Foreign Communication From a Counterpart Application, PCT Application No. PCT/CN2015/072536, English Translation of International Search Report dated May 12, 2015, 2 pages.
Foreign Communication From a Counterpart Application, PCT Application No. PCT/CN2015/072536, Written Opinion dated May 12, 2015, 4 pages.
Machine Translation and Abstract of Chinese Publication No. CN101719166, Jun. 2, 2010, 15 pages.
Foreign Communication From A Counterpart Application, Chinese Application No. 2014103292923, Chinese Search Report dated Jan. 25, 2018, 2 pages.
Foreign Communication From A Counterpart Application, Chinese Application No. 201410329292.3, Chinese Office Action dated Feb. 5, 2018, 3 pages.

* cited by examiner

DATA VISUALIZATION METHOD AND APPARATUS

CROSS-REFERENCE TO RELATED APPLICATIONS

This application is a continuation of International Application No. PCT/CN2015/072536, filed on Feb. 9, 2015, which claims priority to Chinese Patent Application No. 201410329292.3, filed on Jul. 11, 2014, both of which are incorporated herein by reference in its entireties.

TECHNICAL FIELD

The present application relates to the data processing field, and more specifically, to a data visualization method and apparatus.

BACKGROUND

With progress of wireless communications technologies and popularization of intelligent terminal devices, various intelligent services appear, and a check-in service is one of the intelligent services. Check-in may refer to a behavior that a user on a social network publishes, on the network, what the user is doing in a particular location at a particular time. Check-in data is generated for each check-in, where the check-in data may include spatiotemporal behavior information such as a check-in time, a check-in location, and a person who checks in (that is, a check-in user), a check-in activity, and the like. Spatiotemporal behavior information in a single piece of check-in data is random, and spatiotemporal behavior information in massive check-in data has a high research value.

Data visualization may play a function of greatly pushing subsequent data mining, but how to visualize spatiotemporal behavior data (data including spatiotemporal behavior information of a user, for example, check-in data) needs to be resolved urgently.

SUMMARY

Embodiments of the present application provide a data visualization method and apparatus, to visualize spatiotemporal behavior data.

According to a first aspect, a data visualization method is provided, including acquiring a spatiotemporal behavior data set generated by network users, where each piece of spatiotemporal behavior data in the spatiotemporal behavior data set includes time data, determining, according to the time data in each piece of spatiotemporal behavior data, a time point at which or a time period in which each piece of spatiotemporal behavior data is generated, determining, according to the time point at which or the time period in which each piece of spatiotemporal behavior data is generated, an amount of spatiotemporal behavior data that is in the spatiotemporal behavior data set and generated at a time point or in a time period falling within each time period in N time periods, where the N time periods are N time periods that are obtained by dividing one day of 24 hours, one week, or one month; presenting a first circle, where different dots on a circumference line of the first circle are corresponding to different time periods in one day of 24 hours, one week, or one month; a dot corresponding to 0 o'clock is used as a start point, and time periods corresponding to dots on the circumference line sequentially increase in a clockwise direction or a counterclockwise direction, and presenting a column bar corresponding to an $i^{th}$ time period in the N time periods, where the column bar is in a radial direction of the first circle and intersects the first circle. An intersecting position of the column bar and the circumference line is located in a segment of circumference line that is on the circumference line and corresponding to the $i^{th}$ time period. A length of the column bar represents an amount of spatiotemporal behavior data that is in the spatiotemporal behavior data set and generated at a time point or in a time period falling within the $i^{th}$ time period, and i is any integer from 1 to N.

With reference to the first aspect, in an implementation manner of the first aspect, each piece of spatiotemporal behavior data in the spatiotemporal behavior data set further includes behavior data. A behavior corresponding to the behavior data in each piece of spatiotemporal behavior data is one of M preset behaviors, and the method further includes determining, according to the behavior data in each piece of spatiotemporal behavior data, the behavior corresponding to each piece of spatiotemporal behavior data, determining, according to the behavior corresponding to each piece of spatiotemporal behavior data, proportions of amounts of spatiotemporal behavior data that is respectively corresponding to the M behaviors to the amount of the spatiotemporal behavior data falling within the $i^{th}$ time period, and presenting, on the column bar, sub-line segments colored with different colors, where the different colors represent different behaviors in the M behaviors, and a length of the sub-line segment represents a proportion of an amount of spatiotemporal behavior data corresponding to a behavior represented by a color of the sub-line segment to the amount of the spatiotemporal behavior data falling within the $i^{th}$ time period.

With reference to the first aspect or any one of the forgoing implementation manner of the first aspect, in another implementation manner of the first aspect, the spatiotemporal behavior data set is a spatiotemporal behavior data set generated in a target region.

With reference to the first aspect or either of the forgoing implementation manners of the first aspect, in another implementation manner of the first aspect, the method further includes determining, according to the behavior corresponding to each piece of spatiotemporal behavior data in the spatiotemporal behavior data set, proportions of the spatiotemporal behavior data that is respectively corresponding to the M behaviors to the spatiotemporal behavior data set, and presenting, according to the proportions of the spatiotemporal behavior data that is respectively corresponding to the M behaviors, a second circle whose area is divided into M blocks, where the M blocks are respectively colored with the M colors, and an area of each block in the M blocks represents a proportion of spatiotemporal behavior data corresponding to a behavior represented by a color of the block to the spatiotemporal behavior data set.

With reference to the first aspect or any one of the forgoing implementation manners of the first aspect, in another implementation manner of the first aspect, the M blocks are separated in the second circle using Thiessen polygons.

With reference to the first aspect or any one of the forgoing implementation manners of the first aspect, in another implementation manner of the first aspect, the spatiotemporal behavior data set is a spatiotemporal behavior data set generated by a target user group in the network users. Each piece of spatiotemporal behavior data in the spatiotemporal behavior data set further includes location data. A location corresponding to the location data in each piece of spatiotemporal behavior data is distributed in K preset regions, and the method further includes determining, according to the location data in each piece of spatiotemporal behavior data in the spatiotemporal behavior data set, the location corresponding to each piece of spatiotemporal behavior data, determining, according to the location corresponding to each piece of spatiotemporal behavior data, proportions of spatiotemporal behavior data that is respectively generated in the K regions to the spatiotemporal behavior data set, and presenting, according to the proportions of the spatiotemporal behavior data that is respectively generated in the K regions, a second circle including K blocks inside, where position distribution of the K blocks in the second circle is corresponding to position distribution of the K regions in space, and area sizes of the K blocks represent the proportions of the spatiotemporal behavior data that is respectively generated in the K regions to the spatiotemporal behavior data set.

With reference to the first aspect or any one of the forgoing implementation manners of the first aspect, in another implementation manner of the first aspect, the method further includes determining, according to a behavior corresponding to spatiotemporal behavior data generated in a $j^{th}$ region in the K regions, proportions of the spatiotemporal behavior data that is respectively corresponding to the M behaviors to the spatiotemporal behavior data generated in the $j^{th}$ region, where j is any integer from 1 to K, and presenting, according to the proportions of the spatiotemporal behavior data that is respectively corresponding to the M behaviors to the spatiotemporal behavior data generated in the $j^{th}$ region, M sub-blocks in a block corresponding to the $j^{th}$ region, where the M sub-blocks are respectively colored with the M colors, and an area of each sub-block in the M sub-blocks represents a proportion of spatiotemporal behavior data corresponding to a behavior represented by a color of the sub-block to the spatiotemporal behavior data generated in the $j^{th}$ region.

With reference to the first aspect or any one of the forgoing implementation manners of the first aspect, in another implementation manner of the first aspect, the method further includes presenting a first legend, which is used to indicate a one-to-one correspondence between the M behaviors and the M colors.

With reference to the first aspect or any one of the forgoing implementation manners of the first aspect, in another implementation manner of the first aspect, the spatiotemporal behavior data set is a spatiotemporal behavior data set corresponding to a target behavior. Each piece of spatiotemporal behavior data in the spatiotemporal behavior data set further includes location data. A location corresponding to the location data in each piece of spatiotemporal behavior data belongs to one of K preset regions, and the method further includes determining, according to the location data in each piece of spatiotemporal behavior data in the spatiotemporal behavior data set, amounts of spatiotemporal behavior data that is in the spatiotemporal behavior data set and respectively generated in the K regions, selecting, from Z preset numerical intervals, a numerical interval to which the amounts of spatiotemporal behavior data that is respectively generated in the K regions belong, presenting a second legend, where the second legend is used to indicate a one-to-one correspondence between the Z numerical ranges and Z colors, presenting, according to the numerical interval to which the amounts of spatiotemporal behavior data that is respectively generated in the K regions belong, a map including the K regions, where in the map, each region in the K regions is colored with a color corresponding to a numerical interval to which an amount of spatiotemporal behavior data generated in the region belongs, determining, according to the location data in each piece of spatiotemporal behavior data, a location in which each piece of spatiotemporal behavior data is generated, determining, according to the location corresponding to each piece of spatiotemporal behavior data, a proportion of an amount of spatiotemporal behavior data generated in each region set in the K regions to the amount of the spatiotemporal behavior data falling within the $i^{th}$ time period, where in the K regions, regions colored with a same color belong to a region set, and presenting, on the column bar, sub-line segments colored with different colors, where a length of the sub-line segment represents a proportion of an amount of spatiotemporal behavior data generated in a region set that is in the K regions and colored with a color of the sub-line segment to the amount of the spatiotemporal behavior data falling within the $i^{th}$ time period.

With reference to the first aspect or any one of the forgoing implementation manners of the first aspect, in another implementation manner of the first aspect, the K regions in the map are K expanded regions, and an expansion size of each region in the K regions is positively related to an amount of spatiotemporal behavior data that is in the spatiotemporal behavior data set and generated in the region.

With reference to the first aspect or any one of the forgoing implementation manners of the first aspect, in another implementation manner of the first aspect, the second circle has a same center as the first circle and is located inside the first circle.

With reference to the first aspect or any one of the forgoing implementation manners of the first aspect, in another implementation manner of the first aspect, the spatiotemporal behavior data set is a spatiotemporal behavior data set generated on a workday or a weekend. The N time periods are N time periods that are obtained by dividing one day of 24 hours. The different dots on the circumference line of the first circle are corresponding to different moments of one day of 24 hours. The dot corresponding to 0 o'clock is used as a start point, and moments corresponding to dots on the circumference line sequentially increase in a clockwise direction or a counterclockwise direction, and determining, according to the time point at which or the time period in which each piece of spatiotemporal behavior data is generated, an amount of spatiotemporal behavior data that is in the spatiotemporal behavior data set and generated at a time point or in a time period falling within each time period in N time periods includes determining, according to the time point at which or the time period in which each piece of spatiotemporal behavior data is generated, an average amount of spatiotemporal behavior data per day that is in the spatiotemporal behavior data set and generated at the time point or in the time period falling within each time period in the N time periods.

With reference to the first aspect or any one of the forgoing implementation manners of the first aspect, in another implementation manner of the first aspect, the spatiotemporal behavior data set is the spatiotemporal behavior data set generated on a workday. The column bar uses the intersecting position of the column bar and the circumference line as a start point and extends in a direction away from the first circle, and the method further includes acquiring another spatiotemporal behavior data set generated by the network users on a weekend, determining, according to time data in each piece of spatiotemporal behavior data in another spatiotemporal behavior data set, a time point at which or a time period in which each piece of spatiotemporal behavior data in the other spatiotemporal behavior data set, is generated, determining, according to the time point at which or the time period in which each piece of spatiotemporal behavior data in the other spatiotemporal behavior data set, is generated, an average amount of spatiotemporal behavior data per day that is in the spatiotemporal behavior data set and generated at a time point or in a time period falling within each time period in the N time periods, and presenting another column bar corresponding to a $k^{th}$ time period in the N time periods, where the other column bar is in a radial direction of the first circle and intersects the first circle. The other column bar uses an intersecting position of another column bar and the circumference line as a start point and extends to an interior of the first circle. The intersecting position of the other column bar and the circumference line is located in a segment of circumference line that is on the circumference line and corresponding to the $k^{th}$ time period. A length of the other column bar represents an average amount of spatiotemporal behavior data falling within the $k^{th}$ time period per day, and k is any integer from 1 to N.

With reference to the first aspect or any one of the forgoing implementation manners of the first aspect, in another implementation manner of the first aspect, the spatiotemporal behavior data set is check-in data on a social network.

According to a second aspect, a data visualization apparatus is provided, including an acquiring unit configured to acquire a spatiotemporal behavior data set generated by network users, where each piece of spatiotemporal behavior data in the spatiotemporal behavior data set includes time data, a first determining unit configured to determine, according to the time data in each piece of spatiotemporal behavior data acquired by the acquiring unit, a time point at which or a time period in which each piece of spatiotemporal behavior data is generated, a second determining unit configured to determine, according to the time point or the time period at which or in which each piece of spatiotemporal behavior data is generated that is determined by the first determining unit, an amount of spatiotemporal behavior data that is in the spatiotemporal behavior data set and generated at a time point or in a time period falling within each time period in N time periods, where the N time periods are N time periods that are obtained by dividing one day of 24 hours, one week, or one month, and a presenting unit configured to present a first circle, where different dots on a circumference line of the first circle are corresponding to different time periods in one day of 24 hours, one week, or one month, a dot corresponding to 0 o'clock is used as a start point, and time periods corresponding to dots on the circumference line sequentially increase in a clockwise direction or a counterclockwise direction, and present a column bar corresponding to an $i^{th}$ time period in the N time periods, where the column bar is in a radial direction of the first circle and intersects the first circle. An intersecting position of the column bar and the circumference line is located in a segment of circumference line that is on the circumference line and corresponding to the $i^{th}$ time period. A length of the column bar represents an amount of spatiotemporal behavior data that is in the spatiotemporal behavior data set and generated at a time point or in a time period falling within the $i^{th}$ time period, and i is any integer from 1 to N.

With reference to the second aspect, in an implementation manner of the second aspect, each piece of spatiotemporal behavior data in the spatiotemporal behavior data set further includes behavior data. A behavior corresponding to the behavior data in each piece of spatiotemporal behavior data is one of M preset behaviors, and the apparatus further includes a third determining unit configured to determine, according to the behavior data in each piece of spatiotemporal behavior data, the behavior corresponding to each piece of spatiotemporal behavior data, and a fourth determining unit configured to determine, according to the behavior corresponding to each piece of spatiotemporal behavior data, proportions of amounts of spatiotemporal behavior data that is respectively corresponding to the M behaviors to the amount of the spatiotemporal behavior data falling within the $i^{th}$ time period, where the presenting unit is further configured to present, on the column bar, sub-line segments colored with different colors, where the different colors represent different behaviors in the M behaviors, and a length of the sub-line segment represents a proportion of an amount of spatiotemporal behavior data corresponding to a behavior represented by a color of the sub-line segment to the amount of the spatiotemporal behavior data falling within the $i^{th}$ time period.

With reference to the second aspect or any one of the forgoing implementation manner of the second aspect, in another implementation manner of the second aspect, the spatiotemporal behavior data set is a spatiotemporal behavior data set generated in a target region.

With reference to the second aspect or either of the forgoing implementation manners of the second aspect, in another implementation manner of the second aspect, the apparatus further includes a fifth determining unit configured to determine, according to the behavior corresponding to each piece of spatiotemporal behavior data in the spatiotemporal behavior data set, proportions of the spatiotemporal behavior data that is respectively corresponding to the M behaviors to the spatiotemporal behavior data set, where the presenting unit is further configured to present, according to the proportions of the spatiotemporal behavior data that is respectively corresponding to the M behaviors, a second circle whose area is divided into M blocks, where the M blocks are respectively colored with the M colors, and an area of each block in the M blocks represents a proportion of spatiotemporal behavior data corresponding to a behavior represented by a color of the block to the spatiotemporal behavior data set.

With reference to the second aspect or any one of the forgoing implementation manners of the second aspect, in another implementation manner of the second aspect, the M blocks are separated in the second circle using Thiessen polygons.

With reference to the second aspect or any one of the forgoing implementation manners of the second aspect, in another implementation manner of the second aspect, the spatiotemporal behavior data set is a spatiotemporal behavior data set generated by a target user group in the network users. Each piece of spatiotemporal behavior data in the spatiotemporal behavior data set further includes location data. A location corresponding to the location data in each piece of spatiotemporal behavior data is distributed in K preset regions, and the apparatus further includes a sixth determining unit configured to determine, according to the location data in each piece of spatiotemporal behavior data in the spatiotemporal behavior data set, the location corresponding to each piece of spatiotemporal behavior data, and a seventh determining unit configured to determine, according to the location corresponding to each piece of spatiotemporal behavior data, proportions of spatiotemporal behavior data that is respectively generated in the K regions to the spatiotemporal behavior data set. The presenting unit is further configured to present, according to the proportions of the spatiotemporal behavior data that is respectively generated in the K regions, a second circle including K blocks inside, where position distribution of the K blocks in the second circle is corresponding to position distribution of the K regions in space, and area sizes of the K blocks represent the proportions of the spatiotemporal behavior data that is respectively generated in the K regions to the spatiotemporal behavior data set.

With reference to the second aspect or any one of the forgoing implementation manners of the second aspect, in another implementation manner of the second aspect, the apparatus further includes an eighth determining unit configured to determine, according to a behavior corresponding to spatiotemporal behavior data generated in a $j^{th}$ region in the K regions, proportions of the spatiotemporal behavior data that is respectively corresponding to the M behaviors to the spatiotemporal behavior data generated in the $j^{th}$ region, where j is any integer from 1 to K. The presenting unit is further configured to present, according to the proportions of the spatiotemporal behavior data that is respectively corresponding to the M behaviors to the spatiotemporal behavior data generated in the $j^{th}$ region, M sub-blocks in a block corresponding to the $j^{th}$ region, where the M sub-blocks are respectively colored with the M colors, and an area of each sub-block in the M sub-blocks represents a proportion of spatiotemporal behavior data corresponding to a behavior represented by a color of the sub-block to the spatiotemporal behavior data generated in the $j^{th}$ region.

With reference to any one of the second aspect or the forgoing implementation manner of the second aspect, in another implementation manner of the second aspect, the presenting unit is further configured to present a first legend, which is used to indicate a one-to-one correspondence between the M behaviors and the M colors.

With reference to the second aspect or any one of the forgoing implementation manners of the second aspect, in another implementation manner of the second aspect, the spatiotemporal behavior data set is a spatiotemporal behavior data set corresponding to a target behavior. Each piece of spatiotemporal behavior data in the spatiotemporal behavior data set further includes location data. A location corresponding to the location data in each piece of spatiotemporal behavior data belongs to one of K preset regions, and the apparatus further includes a ninth determining unit configured to determine, according to the location data in each piece of spatiotemporal behavior data in the spatiotemporal behavior data set, amounts of spatiotemporal behavior data that is in the spatiotemporal behavior data set and respectively generated in the K regions, and a selecting unit configured to select, from Z preset numerical intervals, a numerical interval to which the amounts of spatiotemporal behavior data that is respectively generated in the K regions belong, where the presenting unit is further configured to present a second legend, where the second legend is used to indicate a one-to-one correspondence between the Z numerical ranges and Z colors, and present, according to the numerical interval to which the amounts of spatiotemporal behavior data that is respectively generated in the K regions belong, a map including the K regions, where in the map, each region in the K regions is colored with a color corresponding to a numerical interval to which an amount of spatiotemporal behavior data generated in the region belongs, and the apparatus further includes a tenth determining unit configured to determine, according to the location data in each piece of spatiotemporal behavior data, a location in which each piece of spatiotemporal behavior data is generated, and an eleventh determining unit configured to determine, according to the location corresponding to each piece of spatiotemporal behavior data, a proportion of an amount of spatiotemporal behavior data generated in each region set in the K regions to the amount of the spatiotemporal behavior data falling within the $i^{th}$ time period, where in the K regions, regions colored with a same color belong to a region set. The presenting unit is further configured to present, on the column bar, sub-line segments colored with different colors, where a length of the sub-line segment represents a proportion of an amount of spatiotemporal behavior data generated in a region set that is in the K regions and colored with a color of the sub-line segment to the amount of the spatiotemporal behavior data falling within the $i^{th}$ time period.

With reference to the second aspect or any one of the forgoing implementation manners of the second aspect, in another implementation manner of the second aspect, the K regions in the map are K expanded regions, and an expansion size of each region in the K regions is positively related to an amount of spatiotemporal behavior data that is in the spatiotemporal behavior data set and generated in the region.

With reference to the second aspect or any one of the forgoing implementation manners of the second aspect, in another implementation manner of the second aspect, the second circle has a same center as the first circle and is located inside the first circle.

With reference to the second aspect or any one of the forgoing implementation manners of the second aspect, in another implementation manner of the second aspect, the spatiotemporal behavior data set is a spatiotemporal behavior data set generated on a workday or a weekend. The N time periods are N time periods that are obtained by dividing one day of 24 hours. The different dots on the circumference line of the first circle are corresponding to different moments of one day of 24 hours. The dot corresponding to 0 o'clock is used as a start point, and moments corresponding to dots on the circumference line sequentially increase in a clockwise direction or a counterclockwise direction, and the second determining unit is further configured to determine, according to the time point at which or the time period in which each piece of spatiotemporal behavior data is generated, an average amount of spatiotemporal behavior data per day that is in the spatiotemporal behavior data set and generated at the time point or in the time period falling within each time period in the N time periods.

With reference to the second aspect or any one of the forgoing implementation manners of the second aspect, in another implementation manner of the second aspect, the spatiotemporal behavior data set is the spatiotemporal behavior data set generated on a workday. The column bar uses the intersecting position of the column bar and the circumference line as a start point and extends in a direction away from the first circle. The acquiring unit is further configured to acquire another spatiotemporal behavior data set generated by the network users on a weekend. The apparatus further includes a twelfth determining unit configured to determine, according to time data in each piece of spatiotemporal behavior data in another spatiotemporal behavior data set, a time point at which or a time period in which each piece of spatiotemporal behavior data in the other spatiotemporal behavior data set, is generated, and a thirteenth determining unit configured to determine, according to the time point at which or the time period in which each piece of spatiotemporal behavior data in the other spatiotemporal behavior data set, is generated, an average amount of spatiotemporal behavior data per day that is in the spatiotemporal behavior data set and generated at a time point or in a time period falling within each time period in the N time periods, and the presenting unit is further configured to present another column bar corresponding to a $k^{th}$ time period in the N time periods, where the other column bar is in a radial direction of the first circle and intersects the first circle, The other column bar uses an intersecting position of the other column bar and the circumference line as a start point and extends to an interior of the first circle. The intersecting position of the other column bar and the circumference line is located in a segment of circumference line that is on the circumference line and corresponding to the $k^{th}$ time period in the N time periods. A length of the other column bar represents an average amount of spatiotemporal behavior data falling within the $k^{th}$ time period per day, and k is any integer from 1 to N.

With reference to the second aspect or any one of the forgoing implementation manners of the second aspect, in another implementation manner of the second aspect, the spatiotemporal behavior data set is check-in data on a social network.

In the embodiments of the present application, a first circle and a column bar are used to present a distribution situation of an amount of spatiotemporal behavior data in each time period. In other words, the first circle represents a time domain, and a length of the column bar represents a quantity of behaviors in a time period corresponding to the column bar. By combining the first circle and the column bar, distribution of the quantity of the behaviors in a time domain can be visually presented, thereby implementing visualization of spatiotemporal behavior data from a perspective of the time domain.

BRIEF DESCRIPTION OF DRAWINGS

To describe the technical solutions in the embodiments of the present application more clearly, the following briefly introduces the accompanying drawings required for describing the embodiments of the present application. The accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. The described embodiments are some but not all of the embodiments of the present application. All other embodiments obtained by a person of ordinary skill in the art based on the embodiments of the present application without creative efforts shall fall within the protection scope of the present application.

It should be understood that, spatiotemporal behavior data in the embodiments of the present application may be check-in data of a user of a social network, where the social network may be any network that has a check-in service, for example, may be a MICROBLOG, WECHAT, or RENREN (Social Networking Services). For ease of understanding, the following mainly uses check-in data as an example for detailed description, but the embodiments of the present application are not limited thereto. Any data that includes spatiotemporal behavior information of a network user shall fall within the protection scope of the present application.

Figure 1:
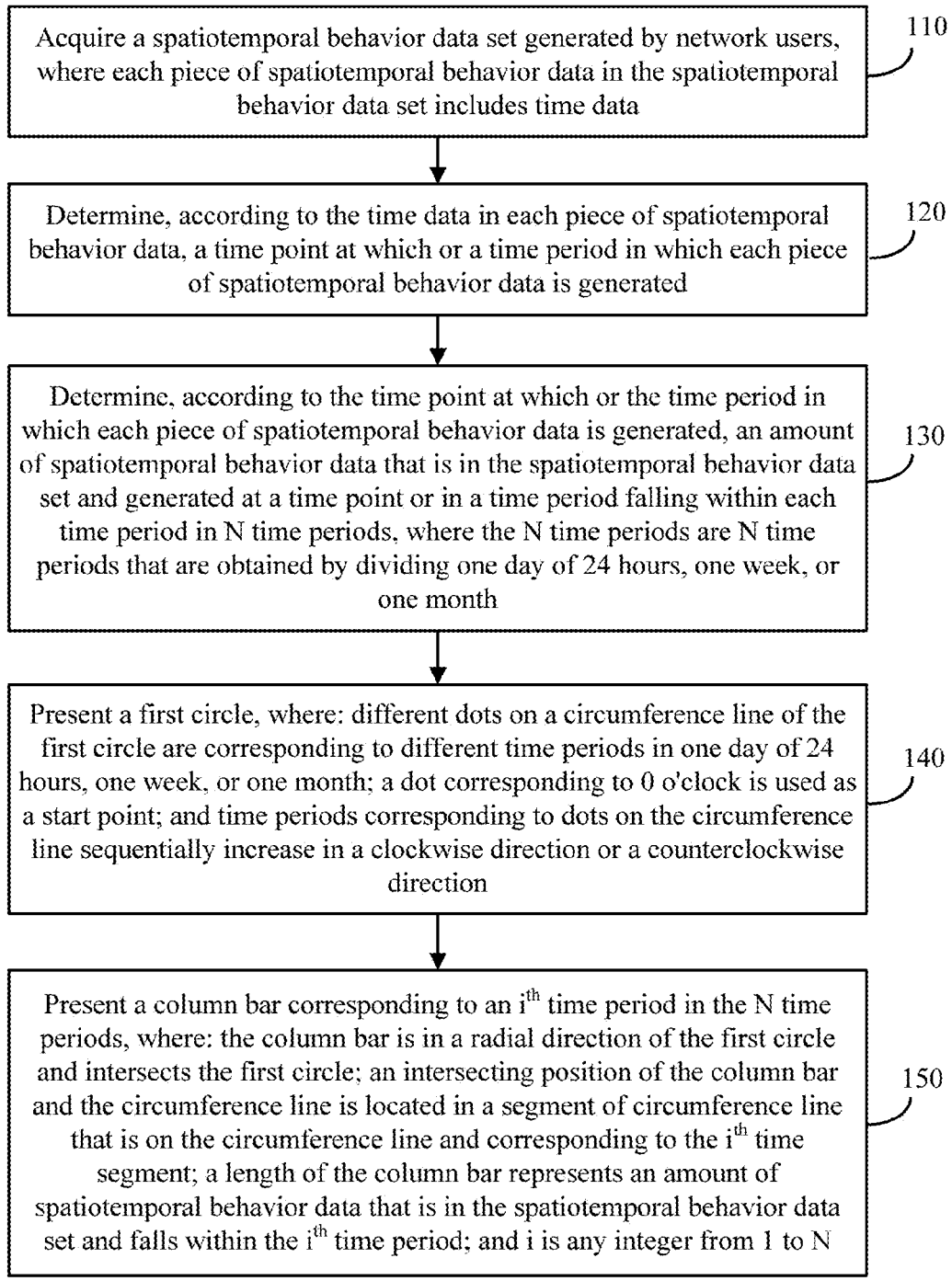
FIG. 1 is a schematic flowchart of a data visualization method according to an embodiment of the present application.

FIG. 1 is a schematic flowchart of a data visualization method according to an embodiment of the present application. The method in FIG. 1 includes the following steps.

Step 110: Acquire a spatiotemporal behavior data set generated by network users, where each piece of spatiotemporal behavior data in the spatiotemporal behavior data set includes time data.

It should be understood that, the foregoing spatiotemporal behavior data set may include massive spatiotemporal behavior data.

Check-in data is used as an example. One piece of check-in data may include time data, location data, and behavior data that are of check-in. The time data records a time at which a user publishes the check-in data. The location data records a location in which the user publishes the check-in data. The behavior data records a type of a check-in behavior of the user. In other words, the check-in data records what a check-in user did in a particular location at a particular time.

Step 120: Determine, according to the time data in each piece of spatiotemporal behavior data, a time point at which or a time period in which each piece of spatiotemporal behavior data is generated.

Time data in a piece of spatiotemporal behavior data may indicate a time point at which the spatiotemporal behavior data is generated, or may indicate a time period in which the spatiotemporal behavior data is generated. Check-in data is used as an example. A check-in time in the check-in data may indicate a moment at which a check-in behavior occurs, or may indicate a period of time in which a check-in behavior occurs, which is not further limited in this embodiment of the present application.

Step 130: Determine, according to the time point at which or the time period in which each piece of spatiotemporal behavior data is generated, an amount of spatiotemporal behavior data that is in the spatiotemporal behavior data set and generated at a time point or in a time period falling within each time period in N time periods, where the N time periods are N time periods that are obtained by dividing one day of 24 hours, one week, or one month.

Step 140: Present a first circle, where different dots on a circumference line of the first circle are corresponding to different time periods in one day of 24 hours, one week, or one month. A dot corresponding to 0 o'clock is used as a start point, and time periods corresponding to dots on the circumference line sequentially increase in a clockwise direction or a counterclockwise direction.

Step 150: Present a column bar corresponding to an $i^{th}$ time period in the N time periods, where the column bar is in a radial direction of the first circle and intersects the first circle. An intersecting position of the column bar and the circumference line is located in a segment of circumference line that is on the circumference line and corresponding to the $i^{th}$ time period. A length of the column bar represents an amount of spatiotemporal behavior data that is in the spatiotemporal behavior data set and generated at a time point or in a time period falling within the $i^{th}$ time period, and i is any integer from 1 to N.

In this embodiment of the present application, a first circle and a column bar are used to present a distribution situation of an amount of spatiotemporal behavior data in each time period. In other words, the first circle represents a time domain, and a length of the column bar represents a quantity of behaviors in a time period corresponding to the column bar. By combining the first circle and the column bar, distribution of the quantity of the behaviors in a time domain can be visually presented, thereby implementing visualization of spatiotemporal behavior data from a perspective of the time domain.

Optionally, the spatiotemporal behavior data set is a spatiotemporal behavior data set generated on a workday or a weekend. The N time periods are N time periods that are obtained by dividing one day of 24 hours. The different dots on the circumference line of the first circle are corresponding to different moments of one day of 24 hours. The dot corresponding to 0 o'clock is used as a start point, and moments corresponding to dots on the circumference line sequentially increase in a clockwise direction or a counter-clockwise direction, step 130 may include determining, according to the time point at which or the time period in which each piece of spatiotemporal behavior data is generated, an average amount of spatiotemporal behavior data per day that is in the spatiotemporal behavior data set and generated at the time point or in the time period falling within each time period in the N time periods. In the following, an example in which the foregoing N time periods are N time periods that are obtained by dividing one day of 24 hours in advance and a length of the column bar represents an average amount of spatiotemporal behavior data falling with the $i^{th}$ time period per day is used for description.

In this embodiment of the present application, a first circle and a column bar are used to present a distribution situation of an average amount of spatiotemporal behavior data generated per day in each time period. In other words, the first circle represents a full time domain of a day, and a length of the column bar represents a quantity of behaviors in a time period corresponding to the column bar. By combining the first circle and the column bar, distribution of the quantity of the behaviors in a full time domain can be visually presented, thereby implementing visualization of spatiotemporal behavior data from a perspective of a time domain.

Figure 2:
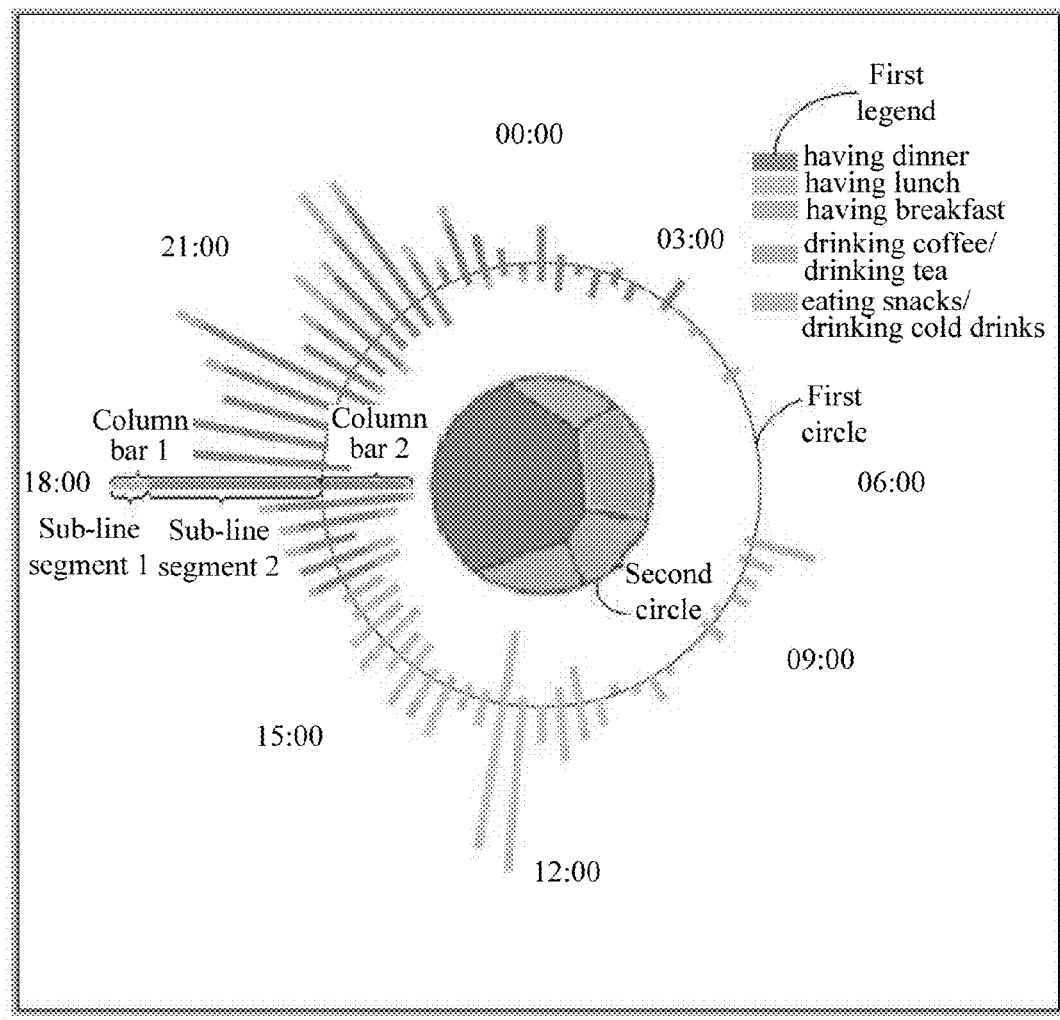
FIG. 2 is a presented figure according to an embodiment of the present application.
Figure 3:
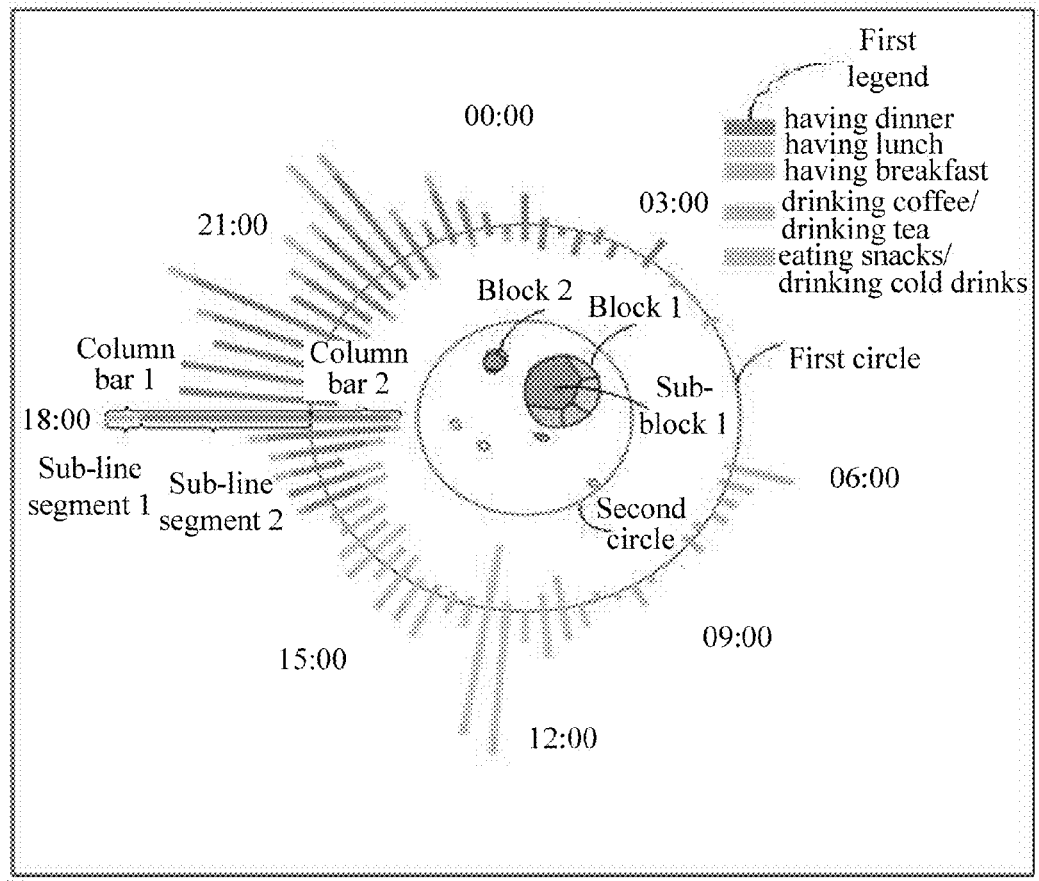
FIG. 3 is a presented figure according to an embodiment of the present application.
Figure 4:
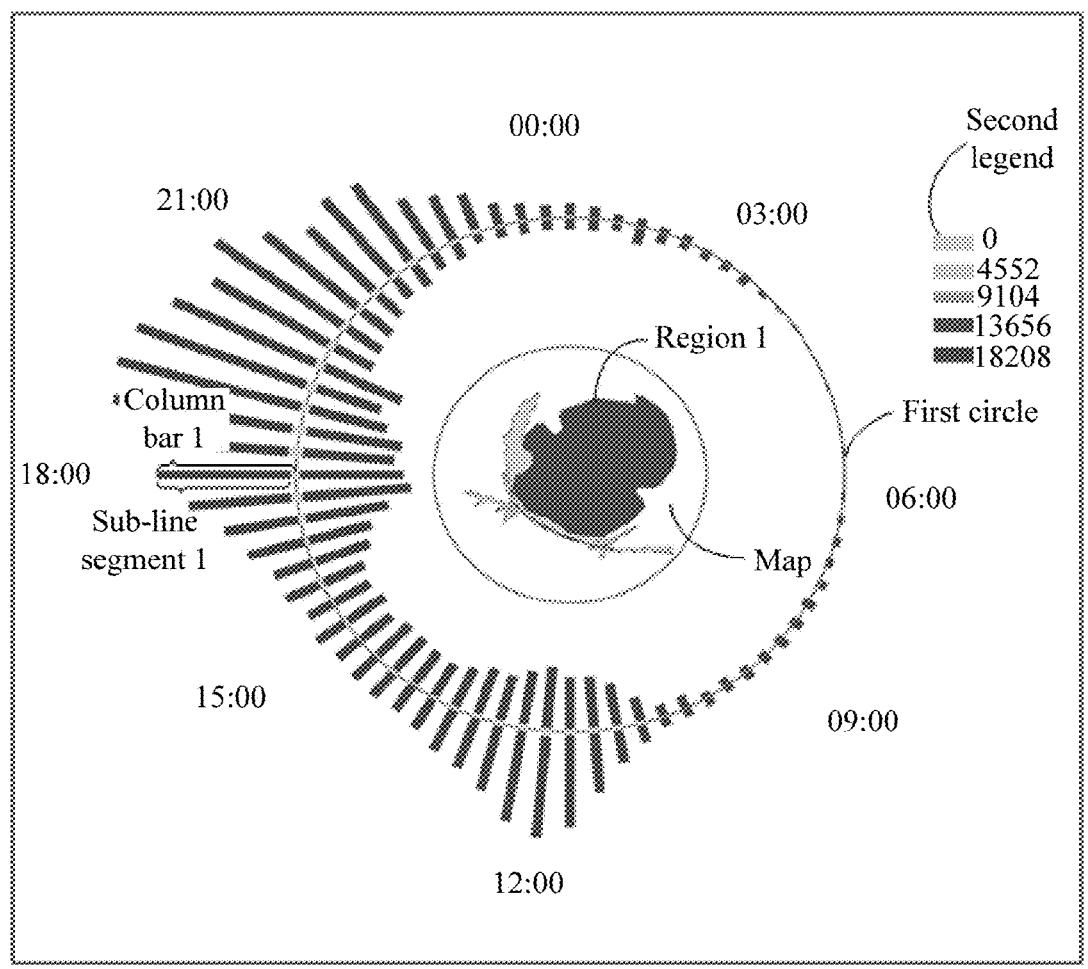
FIG. 4 is a presented figure according to an embodiment of the present application.

FIG. 2 to FIG. 4 are used as examples for description. It should be noted that, in FIG. 2 to FIG. 4, a column bar is intersected by a first circle, and is divided into a column bar located outside the first circle and a column bar located inside the first circle. The column bar located outside the first circle may be used to indicate a distribution situation of an average amount of spatiotemporal behavior data generated per day in each time period on a workday, and the column bar located inside the first circle may be used to indicate an average amount of spatiotemporal behavior data generated per day in each time period on a weekend. When each piece of spatiotemporal behavior data in the spatiotemporal behavior data set in the embodiment in FIG. 1 is generated on a workday, the column bar described in the embodiment in FIG. 1 may be corresponding to a column bar in FIG. 2 to FIG. 4 that is located outside the first circle. When each piece of spatiotemporal behavior data in the spatiotemporal behavior data set in the embodiment in FIG. 1 is generated on a weekend, the column bar described in the embodiment in FIG. 1 may be corresponding to a column bar in FIG. 2 to FIG. 4 that is located inside the first circle. In the following, an example in which the column bar in the embodiment in FIG. 1 is a column bar outside the first circle is used for description.

In FIG. 2, the first circle performs a function similar to that of a clock, where a right half of the first circle indicates moments from 00:00 to 12:00, and a left half of the first circle indicates moments returning from 12:00 to 00:00. The foregoing N time periods may be 24 time periods formed by dividing one day of 24 hours by one hour per time segment, or may be 48 time periods obtained by dividing one day of 24 hours by a half hour per time period, which is not limited in this embodiment of the present application.

It should be noted that, when an average quantity of check-in times per day in each time period in the N time periods is not 0, each time period may be corresponding to one column bar. However, when an average quantity of check-in times per day in some time periods is 0, lengths of column bars corresponding to these time periods are 0, and the column bars corresponding to the time periods are not presented in the figure. As shown in FIG. 2 to FIG. 4, not each time period is corresponding to a column bar located outside the first circle.

An example in which the foregoing $i^{th}$ time period is a time period around 18:00 is used. The column bar in FIG. 1 is column bar 1 in FIG. 2. It can be seen from FIG. 2 that, column bar 1 is located in an arc line that is on the circumferential line of the first circle and corresponding to 18:00. A length of column bar 1 is relatively long, which indicates that an amount of spatiotemporal behavior data generated around 18:00 is relatively large.

Optionally, in an embodiment, each piece of spatiotemporal behavior data in the spatiotemporal behavior data set further includes behavior data, and a behavior corresponding to the behavior data in each piece of spatiotemporal behavior data is one of M preset behaviors. The method in FIG. 1 may further include determining, according to the behavior data in each piece of spatiotemporal behavior data, the behavior corresponding to each piece of spatiotemporal behavior data, determining, according to the behavior corresponding to each piece of spatiotemporal behavior data, proportions of amounts of spatiotemporal behavior data that is respectively corresponding to the M behaviors to the amount of the spatiotemporal behavior data falling within the $i^{th}$ time period, and presenting, on the column bar, sub-line segments colored with different colors, where the different colors represent different behaviors in the M behaviors, and a length of the sub-line segment represents a proportion of an amount of spatiotemporal behavior data corresponding to a behavior represented by a color of the sub-line segment to the amount of the spatiotemporal behavior data falling within the $i^{th}$ time period.

Check-in data is used as an example. Check-in data in which a check-in behavior belongs to the M preset behaviors may be obtained by screening check-in data of a user of a social network. Referring to FIG. 2 and FIG. 3, the foregoing M behaviors are the following five behaviors: having dinner, having lunch, having breakfast, drinking coffee/drinking tea, and eating snacks/drinking cold drinks. Different behaviors are corresponding to different colors (refer to a first legend at an upper right corner in FIG. 2. It should be noted that colors in FIG. 2 to FIG. 4 are indicated using a grayscale, and in actual display, a specific color such as red or yellow is presented on a display interface). Column bar 1 includes sub-line segment 1 and sub-line segment 2, which are respectively colored with different colors. It can be seen from the first legend in FIG. 2 that, a behavior corresponding to a color of sub-line segment 1 is drinking coffee/drinking tea, and a behavior corresponding to a color of sub-line segment 2 is having dinner. That is, in the time period around 18:00, a behavior checked in by users is mainly drinking coffee/drinking tea and having dinner. In addition, a length of sub-line segment 2 is far greater than a length of sub-line segment 1, and therefore, among check-in users in the time period around 18:00, a quantity of people who are having dinner is far greater than a quantity of people who are drinking coffee/drinking tea.

In this embodiment of the present application, a behavior occurred in each time period can be visually observed by means of a color of each column bar, and a proportion of each behavior occurred in each time period can be visually observed by means of a length of each sub-line segment of each column bar. In other words, a first circle is used to represent a time domain. A length of a column bar is used to represent a quantity of behaviors. A color of a column bar is used to represent a type of behavior. Using a presented figure, distribution of a user behavior is visually presented from two dimensions, that is, a time domain and a behavior, thereby improving a visualization degree of spatiotemporal behavior information.

Further, the spatiotemporal behavior data set is a spatiotemporal behavior data set generated in a target region. Check-in data is used as an example. Check-in data in which a check-in location is in the target region is obtained by screening check-in data of a user of a social network and used as spatiotemporal behavior data in the foregoing spatiotemporal behavior data set.

In this embodiment of the present application, by acquiring spatiotemporal behavior data in a target region, a presented figure visually presents distribution of a user behavior in the target region from two dimensions, that is, a time domain and a behavior. On this basis, the foregoing figures corresponding to multiple target regions may be presented on a map with reference to the map, which is equivalent to visually presenting, on the map, information in three dimensions, that is, a time domain, a district, and a behavior, thereby improving a visualization degree of spatiotemporal behavior information.

Further, the method in FIG. 1 may include determining, according to the behavior corresponding to each piece of spatiotemporal behavior data in the spatiotemporal behavior data set, proportions of the spatiotemporal behavior data that is respectively corresponding to the M behaviors to the spatiotemporal behavior data set, and presenting, according to the proportions of the spatiotemporal behavior data that is respectively corresponding to the M behaviors, a second circle whose area is divided into M blocks, where the M blocks are respectively colored with the M colors, and an area of each block in the M blocks represents a proportion of spatiotemporal behavior data corresponding to a behavior represented by a color of the block to the spatiotemporal behavior data set. In addition, the M blocks may be presented in the second circle using pie charts or Thiessen polygons.

For details, refer to FIG. 2. In FIG. 2, the second circle includes five blocks, where each block is corresponding to one behavior in the first legend, and a size of the block is corresponding to a proportion of the behavior. A proportion of each behavior in the spatiotemporal behavior set can be generally presented using a color and a size of a block in the second circle, thereby further improving a visualization degree of spatiotemporal behavior information.

Optionally, in an embodiment, the spatiotemporal behavior data set is a spatiotemporal behavior data set generated by a target user group in the network users. Each piece of spatiotemporal behavior data in the spatiotemporal behavior data set further includes location data. A location corresponding to the location data in each piece of spatiotemporal behavior data is distributed in K preset districts. The method in FIG. 1 may further include determining, according to the location data in each piece of spatiotemporal behavior data in the spatiotemporal behavior data set, the location corresponding to each piece of spatiotemporal behavior data, determining, according to the location corresponding to each piece of spatiotemporal behavior data, proportions of spatiotemporal behavior data that is respectively generated in the K districts to the spatiotemporal behavior data set, and presenting, according to the proportions of the spatiotemporal behavior data that is respectively generated in the K districts, a second circle including K blocks inside, where position distribution of the K blocks in the second circle is corresponding to position distribution of the K districts in space, and area sizes of the K blocks represent the proportions of the spatiotemporal behavior data that is respectively generated in the K districts to the spatiotemporal behavior data set.

Check-in data is used as an example. Check-in data that is in a target user group and in which a check-in location is in the K districts is obtained by screening check-in data of a user of a social network. For example, users whose check-in location is in six districts of Shanghai and whose average quantity of check-in times per day ranks top 50 are obtained by screening. After such a check-in data set is acquired, check-in information of the user group can be presented using a figure, thereby visualizing check-in information of a specific user group.

In this embodiment of the present application, a second circle represents a distribution situation of behaviors in different districts. With reference to a first circle and a column bar, distribution of a user behavior of a target user group is visually presented from three dimensions, that is, a time domain, a district, and a behavior.

For details, refer to FIG. 3. In FIG. 3, the second circle includes six districts, which are represented using six blocks (that is, six closed geometric patterns in the second circle in FIG. 3). A relative position relationship of the six blocks in the second circle is determined according to an actual geographic location relationship of six corresponding regions. Therefore, it is convenient to identify, according to the relative location relationship, which region is corresponding to which block. In addition, in FIG. 3, sizes of the six blocks are determined based on an amount of spatiotemporal behavior data that in in the spatiotemporal behavior data set and occupied by a region corresponding to each block. A larger amount results in a larger block. Check-in data is used as an example. In FIG. 3, block 1 is the largest, which indicates that a quantity of check-in times in a region corresponding to block 1 is the largest, block 2 is smaller, which indicates that a quantity of check-in times in a region corresponding to block 2 is smaller, other blocks are even smaller, which indicates that a quantity of check-in times in regions corresponding to the other blocks is even smaller.

The method in FIG. 1 may further include determining, according to a behavior corresponding to spatiotemporal behavior data generated in a $j^{th}$ region in the K regions, proportions of the spatiotemporal behavior data that is respectively corresponding to the M behaviors to the spatiotemporal behavior data generated in the $j^{th}$ region, where j is any integer from 1 to K, and presenting, according to the proportions of the spatiotemporal behavior data that is respectively corresponding to the M behaviors to the spatiotemporal behavior data generated in the $j^{th}$ region, M sub-blocks in a block corresponding to the $j^{th}$ region, where the M sub-blocks are respectively colored with the M colors, and an area of each sub-block in the M sub-blocks represents a proportion of spatiotemporal behavior data corresponding to a behavior represented by a color of the sub-block to the spatiotemporal behavior data generated in the $j^{th}$ region.

It should be noted that, when a proportion of spatiotemporal behavior data corresponding to a behavior in the spatiotemporal behavior data generated in the $j^{th}$ region is 0, in the block corresponding to the $j^{th}$ region, an area of a sub-block corresponding to the behavior is 0, that is, the sub-block corresponding to the behavior does not exist.

Furthermore, referring to FIG. 3, check-in data is used as an example. Block 1 includes five sub-blocks, which are respectively colored with different colors. Sub-block 1 is the largest in the five sub-blocks, and sub-block 1 is colored with a color corresponding to a behavior of having dinner. That is, in a region corresponding to sub-block 1, a proportion of users that check in the behavior of having dinner is the largest.

Optionally, in an embodiment, the spatiotemporal behavior data set is a spatiotemporal behavior data set corresponding to a target behavior. Each piece of spatiotemporal behavior data in the spatiotemporal behavior data set further includes location data. A location corresponding to the location data in each piece of spatiotemporal behavior data belongs to one of K preset regions. The method in FIG. 1 may further include determining, according to the location data in each piece of spatiotemporal behavior data in the spatiotemporal behavior data set, amounts of spatiotemporal behavior data that is in the spatiotemporal behavior data set and respectively generated in the K regions, selecting, from Z preset numerical intervals, a numerical interval to which the amounts of spatiotemporal behavior data that is respectively generated in the K regions belong, presenting a second legend, where the second legend is used to indicate a one-to-one correspondence between the Z numerical ranges and Z colors, presenting, according to the numerical interval to which the amounts of spatiotemporal behavior data that is respectively generated in the K regions belong, a map including the K regions, where in the map, each region in the K regions is colored with a color corresponding to a numerical interval to which an amount of spatiotemporal behavior data generated in the region belongs, determining, according to the location data in each piece of spatiotemporal behavior data, a location in which each piece of spatiotemporal behavior data is generated, determining, according to the location corresponding to each piece of spatiotemporal behavior data, a proportion of an amount of spatiotemporal behavior data generated in each region set in the K regions to the amount of the spatiotemporal behavior data falling within the $i^{th}$ time period, where in the K regions, regions colored with a same color belong to a region set, and presenting, on the column bar, sub-line segments colored with different colors, where a length of the sub-line segment represents a proportion of an amount of spatiotemporal behavior data generated in a region set that is in the K regions and colored with a color of the sub-line segment to the amount of the spatiotemporal behavior data falling within the $i^{th}$ time period.

Further, the K regions in the map may be K expanded regions, and an expansion size of each region in the K regions is positively related to an amount of spatiotemporal behavior data that is in the spatiotemporal behavior data set and generated in the region.

Referring to FIG. 4, check-in data is used as an example. In FIG. 4, the map displays six regions of Shanghai, but shapes of the six regions are displayed in a region expansion manner according to a quantity of check-in times in each region. That is, more check-in times results in a larger region after expansion. It can be seen from FIG. 4 that, region 1 is expanded to an extremely large scale, and occupies a very large area of an inner circle. However, other regions are all very small and occupy a strip of region in the inner circle together. As shown in the second legend in FIG. 4, region 1 is colored with a color corresponding to 18208, and all other regions are colored with a color corresponding to 0. That is, region 1 is a region set (hereinafter referred to as region set 1), and the other regions form another region set (hereinafter referred to as region set 2). In region set 1, a quantity of check-in times of the target behavior is greater than or equal to 18208. In region set 2, a quantity of check-in times of the target behavior falls within an interval [0, 4552]. Further, in FIG. 4, column bar 1 is divided into two sub-line segments, that is, sub-line segment 1 and sub-line segment 2 (sub-line segment 2 is a remaining part of column bar 1 excluding sub-line segment 1. Because a length of sub-line segment 2 is relatively short, sub-line segment 2 is not marked out in FIG. 4). Sub-line segment 1 is colored with a color the same as that of map set 1 and sub-line segment 2 is colored with a color the same as that of region set 2. Proportions of sub-line segment 1 and sub-line segment 2 in column bar 1 indicate that in the time period around 18:00, region set 1 occupies a vast majority of an average quantity of check-in times of the target behavior, and region set 2 occupies only a very small part.

In this embodiment of the present application, by observing a map, a distribution situation of check-in based on a target behavior that is in each region can be visually seen, by observing a length of a column bar and an arrangement manner of the column bar, a distribution situation of a target check-in behavior in each time period of a day can be visually seen, by observing a length and a color that are of each sub-line segment of a column bar corresponding to a time period, a proportion of a check-in behavior in each region in the time period can be visually seen. In other words, in a presented figure, a first circle is used to represent a full time domain. A length of a column bar is used to represent a quantity of behaviors. A color of a column bar is used to represent a region. Using the figure, a distribution situation of a specific user behavior is presented from two dimensions, that is, a time domain and a region, thereby improving a visualization degree of spatiotemporal behavior information.

Optionally, in an embodiment, the spatiotemporal behavior data set is the spatiotemporal behavior data set generated on a workday. The column bar uses the intersecting position of the column bar and the circumference line as a start point and extends in a direction away from the first circle. The method in FIG. 1 may further include acquiring another spatiotemporal behavior data set generated by the network users on a weekend, determining, according to time data in each piece of spatiotemporal behavior data in another spatiotemporal behavior data set, a time point at which or a time period in which each piece of spatiotemporal behavior data in the other spatiotemporal behavior data set, is generated, determining, according to the time point at which or the time period in which each piece of spatiotemporal behavior data in the other spatiotemporal behavior data set, is generated, an average amount of spatiotemporal behavior data per day that is in the spatiotemporal behavior data set and generated at a time point or in a time period falling within each time period in the N time periods, and presenting another column bar corresponding to a $k^{th}$ time period in the N time periods, where the other column bar is in a radial direction of the first circle and intersects the first circle. The other column bar uses an intersecting position of the other column bar and the circumference line as a start point and extends to an interior of the first circle. The intersecting position of the other column bar and the circumference line is located in a segment of circumference line that is on the circumference line and corresponding to the $k^{th}$ time period. A length of the other column bar represents an average amount of spatiotemporal behavior data falling within the $k^{th}$ time period per day, and k is any integer from 1 to N.

For details, refer to FIG. 2 to FIG. 4. FIG. 2 is used as an example. The foregoing column bar is one of column bars located outside the first circle in FIG. 2, and the other column bar is one of column bars located inside the first circle FIG. 2. It can be seen from FIG. 2 that, in a corresponding time period, column bars located on both sides of the first circle can be connected into one column bar. For example, in the time period around 18:00, column bar 1 located outside the first circle and column bar 2 located inside the first circle compose one column bar that intersects the first circle. In other words, in this embodiment of the present application, column bars are divided by function, and column bars with different functions may be two parts of a same column bar.

Figure 5:
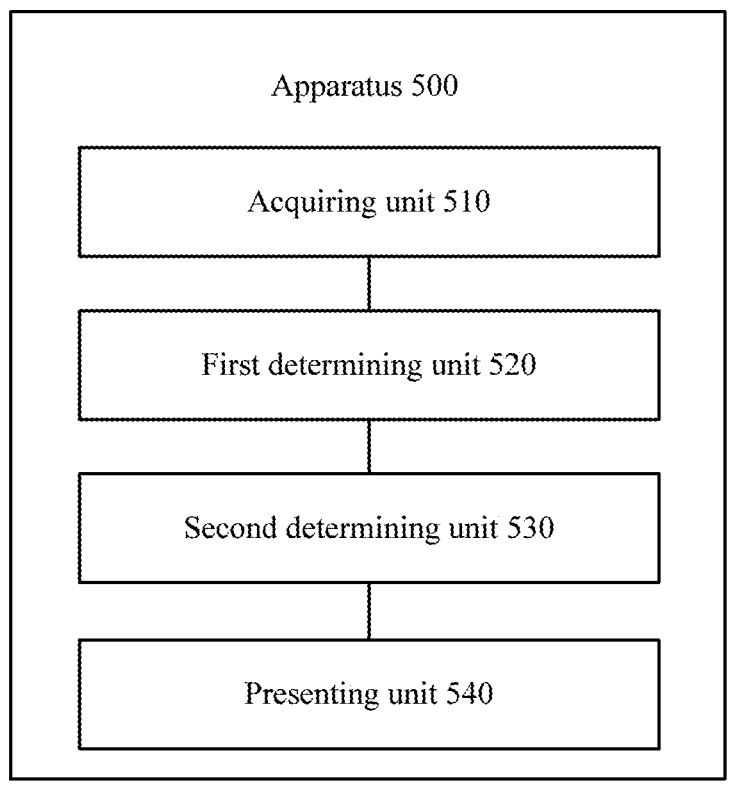
FIG. 5 is a schematic block diagram of a data visualization apparatus according to an embodiment of the present application.
Figure 6:
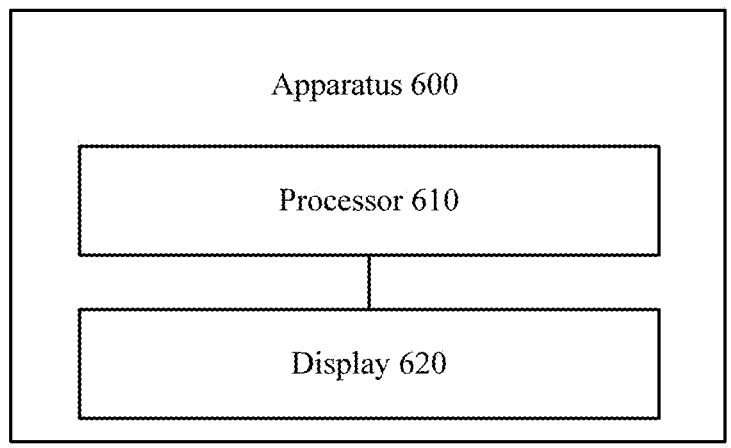
FIG. 6 is a schematic block diagram of a data visualization apparatus according to an embodiment of the present application.

With reference to FIG. 1 to FIG. 4, the foregoing describes in detail the data visualization method according to embodiments of the present application. With reference to FIG. 5 to FIG. 6, the following describes in detail a data visualization apparatus according to the embodiments of the present application.

FIG. 5 is a schematic block diagram of a data visualization apparatus according to an embodiment of the present application. An apparatus 500 in FIG. 5 can implement steps in FIG. 1, and to avoid repetition, details are not described herein again. The apparatus 500 includes an acquiring unit 510 configured to acquire a spatiotemporal behavior data set generated by network users, where each piece of spatiotemporal behavior data in the spatiotemporal behavior data set includes time data, a first determining unit 520 configured to determine, according to the time data in each piece of spatiotemporal behavior data acquired by the acquiring unit, a time point at which or a time period in which each piece of spatiotemporal behavior data is generated, a second determining unit 530 configured to determine, according to the time point or the time period at which or in which each piece of spatiotemporal behavior data is generated that is determined by the first determining unit 520, an amount of spatiotemporal behavior data that is in the spatiotemporal behavior data set and generated at a time point or in a time period falling within each time period in N time periods, where the N time periods are N time periods that are obtained by dividing one day of 24 hours, one week, or one month, and a presenting unit 540 configured to present a first circle, where different dots on a circumference line of the first circle are corresponding to different time periods in one day of 24 hours, one week, or one month. A dot corresponding to 0 o'clock is used as a start point, and time periods corresponding to dots on the circumference line sequentially increase in a clockwise direction or a counterclockwise direction, and present a column bar corresponding to an $i^{th}$ time period in the N time periods, where the column bar is in a radial direction of the first circle and intersects the first circle. An intersecting position of the column bar and the circumference line is located in a segment of circumference line that is on the circumference line and corresponding to the $i^{th}$ time period. A length of the column bar represents an amount of spatiotemporal behavior data that is in the spatiotemporal behavior data set and generated at a time point or in a time period falling within the $i^{th}$ time period, and i is any integer from 1 to N.

In this embodiment of the present application, a first circle and a column bar are used to present a distribution situation of an amount of spatiotemporal behavior data in each time period. In other words, the first circle represents a time domain, and a length of the column bar represents a quantity of behaviors in a time period corresponding to the column bar. By combining the first circle and the column bar, distribution of the quantity of the behaviors in a time domain can be visually presented, thereby implementing visualization of spatiotemporal behavior data from a perspective of the time domain.

Optionally, in an embodiment, each piece of spatiotemporal behavior data in the spatiotemporal behavior data set further includes behavior data, and a behavior corresponding to the behavior data in each piece of spatiotemporal behavior data is one of M preset behaviors. The apparatus 500 may further include a third determining unit configured to determine, according to the behavior data in each piece of spatiotemporal behavior data, the behavior corresponding to each piece of spatiotemporal behavior data, and a fourth determining unit configured to determine, according to the behavior corresponding to each piece of spatiotemporal behavior data, proportions of amounts of spatiotemporal behavior data that is respectively corresponding to the M behaviors to the amount of the spatiotemporal behavior data falling within the $i^{th}$ time period, where the presenting unit 540 may be further configured to present, on the column bar, sub-line segments colored with different colors, where the different colors represent different behaviors in the M behaviors, and a length of the sub-line segment represents a proportion of an amount of spatiotemporal behavior data corresponding to a behavior represented by a color of the sub-line segment to the amount of the spatiotemporal behavior data falling within the $i^{th}$ time period.

Optionally, in an embodiment, the spatiotemporal behavior data set is a spatiotemporal behavior data set generated in a target region.

Optionally, in an embodiment, the apparatus 500 may further include a fifth determining unit configured to determine, according to the behavior corresponding to each piece of spatiotemporal behavior data in the spatiotemporal behavior data set, proportions of the spatiotemporal behavior data that is respectively corresponding to the M behaviors to the spatiotemporal behavior data set, where the presenting unit 540 may be further configured to present, according to the proportions of the spatiotemporal behavior data that is respectively corresponding to the M behaviors, a second circle whose area is divided into M blocks, where the M blocks are respectively colored with the M colors, and an area of each block in the M blocks represents a proportion of spatiotemporal behavior data corresponding to a behavior represented by a color of the block to the spatiotemporal behavior data set.

Optionally, in an embodiment, the M blocks are separated in the second circle using Thiessen polygons.

Optionally, in an embodiment, the spatiotemporal behavior data set is a spatiotemporal behavior data set generated by a target user group in the network users. Each piece of spatiotemporal behavior data in the spatiotemporal behavior data set further includes location data. A location corresponding to the location data in each piece of spatiotemporal behavior data is distributed in K preset regions. The apparatus 500 may further include a sixth determining unit configured to determine, according to the location data in each piece of spatiotemporal behavior data in the spatiotemporal behavior data set, the location corresponding to each piece of spatiotemporal behavior data, a seventh determining unit configured to determine, according to the location corresponding to each piece of spatiotemporal behavior data, proportions of spatiotemporal behavior data that is respectively generated in the K regions to the spatiotemporal behavior data set, where the presenting unit 540 may be further configured to present, according to the proportions of the spatiotemporal behavior data that is respectively generated in the K regions, a second circle including K blocks inside, where position distribution of the K blocks in the second circle is corresponding to position distribution of the K regions in space, and area sizes of the K blocks represent the proportions of the spatiotemporal behavior data that is respectively generated in the K regions to the spatiotemporal behavior data set.

Optionally, in an embodiment, the apparatus 500 may further include an eighth determining unit configured to determine, according to a behavior corresponding to spatiotemporal behavior data generated in a $j^{th}$ region in the K regions, proportions of the spatiotemporal behavior data that is respectively corresponding to the M behaviors to the spatiotemporal behavior data generated in the $j^{th}$ region, where j is any integer from 1 to K, where the presenting unit 540 may be further configured to present, according to the proportions of the spatiotemporal behavior data that is respectively corresponding to the M behaviors to the spatiotemporal behavior data generated in the $j^{th}$ region, M sub-blocks in a block corresponding to the $j^{th}$ region, where the M sub-blocks are respectively colored with the M colors, and an area of each sub-block in the M sub-blocks represents a proportion of spatiotemporal behavior data corresponding to a behavior represented by a color of the sub-block to the spatiotemporal behavior data generated in the $j^{th}$ region.

Optionally, in an embodiment, the presenting unit 540 may be further configured to present a first legend, which is used to indicate a one-to-one correspondence between the M behaviors and the M colors.

Optionally, in an embodiment, the spatiotemporal behavior data set is a spatiotemporal behavior data set corresponding to a target behavior. Each piece of spatiotemporal behavior data in the spatiotemporal behavior data set further includes location data. A location corresponding to the location data in each piece of spatiotemporal behavior data belongs to one of K preset regions. The apparatus 500 may further include a ninth determining unit configured to determine, according to the location data in each piece of spatiotemporal behavior data in the spatiotemporal behavior data set, amounts of spatiotemporal behavior data that is in the spatiotemporal behavior data set and respectively generated in the K regions, and a selecting unit configured to select, from Z preset numerical intervals, a numerical interval to which the amounts of spatiotemporal behavior data that is respectively generated in the K regions belong, where the presenting unit 540 may be further configured to present a second legend, where the second legend is used to indicate a one-to-one correspondence between the Z numerical ranges and Z colors, and present, according to the numerical interval to which the amounts of spatiotemporal behavior data that is respectively generated in the K regions belong, a map including the K regions, where in the map, each region in the K regions is colored with a color corresponding to a numerical interval to which an amount of spatiotemporal behavior data generated in the region belongs. The apparatus 500 may further include a tenth determining unit configured to determine, according to the location data in each piece of spatiotemporal behavior data, a location in which each piece of spatiotemporal behavior data is generated, and an eleventh determining unit configured to determine, according to the location corresponding to each piece of spatiotemporal behavior data, a proportion of an amount of spatiotemporal behavior data generated in each region set in the K regions to the amount of the spatiotemporal behavior data falling within the $i^{th}$ time period, where in the K regions, regions colored with a same color belong to a region set, where the presenting unit 540 may be further configured to present, on the column bar, sub-line segments colored with different colors, where a length of the sub-line segment represents a proportion of an amount of spatiotemporal behavior data generated in a region set that is in the K regions and colored with a color of the sub-line segment to the amount of the spatiotemporal behavior data falling within the $i^{th}$ time period.

Optionally, in an embodiment, the K regions in the map are K expanded regions, and an expansion size of each region in the K regions is positively related to an amount of spatiotemporal behavior data that is in the spatiotemporal behavior data set and generated in the region.

Optionally, in an embodiment, the second circle has a same center as the first circle and is located inside the first circle.

Optionally, in an embodiment, the spatiotemporal behavior data set is a spatiotemporal behavior data set generated on a workday or a weekend. The N time periods are N time periods that are obtained by dividing one day of 24 hours. The different dots on the circumference line of the first circle are corresponding to different moments of one day of 24 hours. The dot corresponding to 0 o'clock is used as a start point, and moments corresponding to dots on the circumference line sequentially increase in a clockwise direction or a counterclockwise direction. The second determining unit is further configured to determine, according to the time point at which or the time period in which each piece of spatiotemporal behavior data is generated, an average amount of spatiotemporal behavior data per day that is in the spatiotemporal behavior data set and generated at the time point or in the time period falling within each time period in the N time periods.

Optionally, in an embodiment, the spatiotemporal behavior data set is the spatiotemporal behavior data set generated on a workday. The column bar uses the intersecting position of the column bar and the circumference line as a start point and extends in a direction away from the first circle. The acquiring unit 510 may be further configured to acquire another spatiotemporal behavior data set generated by the network users on a weekend. The apparatus further includes a twelfth determining unit configured to determine, according to time data in each piece of spatiotemporal behavior data in another spatiotemporal behavior data set, a time point at which or a time period in which each piece of spatiotemporal behavior data in the other spatiotemporal behavior data set, is generated, and a thirteenth determining unit configured to determine, according to the time point at which or the time period in which each piece of spatiotemporal behavior data in the other spatiotemporal behavior data set, is generated, an average amount of spatiotemporal behavior data per day that is in the spatiotemporal behavior data set and generated at a time point or in a time period falling within each time period in the N time periods, and the presenting unit 540 may be further configured to present another column bar corresponding to a $k^{th}$ time period in the N time periods, where the other column bar is in a radial direction of the first circle and intersects the first circle. The other column bar uses an intersecting position of the other column bar and the circumference line as a start point and extends to an interior of the first circle. The intersecting position of the other column bar and the circumference line is located in a segment of circumference line that is on the circumference line and corresponding to the $k^{th}$ time period, a length of the other column bar represents an average amount of spatiotemporal behavior data falling within the $k^{th}$ time period per day, and k is any integer from 1 to N.

Optionally, in an embodiment, the spatiotemporal behavior data is check-in data on a social network.

FIG. 6 is a schematic block diagram of a data visualization apparatus according to an embodiment of the present application. An apparatus 600 in FIG. 6 can implement steps in FIG. 1, and to avoid repetition, details are not described herein again. The apparatus 600 includes a processor 610 configured to acquire a spatiotemporal behavior data set generated by network users, where each piece of spatiotemporal behavior data in the spatiotemporal behavior data set includes time data, determine, according to the time data in each piece of spatiotemporal behavior data, a time point at which or a time period in which each piece of spatiotemporal behavior data is generated, and determine, according to the time point at which or the time period in which each piece of spatiotemporal behavior data is generated, an amount of spatiotemporal behavior data that is in the spatiotemporal behavior data set and generated at a time point or in a time period falling within each time period in N time periods, where the N time periods are N time periods that are obtained by dividing one day of 24 hours, one week, or one month, and a display 620 configured to present a first circle, where different dots on a circumference line of the first circle are corresponding to different time periods in one day of 24 hours, one week, or one month, a dot corresponding to 0 o'clock is used as a start point, and time periods corresponding to dots on the circumference line sequentially increase in a clockwise direction or a counterclockwise direction, and present a column bar corresponding to an $i^{th}$ time period in the N time periods, where the column bar is in a radial direction of the first circle and intersects the first circle. An intersecting position of the column bar and the circumference line is located in a segment of circumference line that is on the circumference line and corresponding to the $i^{th}$ time period. A length of the column bar represents an amount of spatiotemporal behavior data that is in the spatiotemporal behavior data set and generated at a time point or in a time period falling within the $i^{th}$ time period, and i is any integer from 1 to N.

In this embodiment of the present application, a first circle and a column bar are used to present a distribution situation of an amount of generated spatiotemporal behavior data in each time period. In other words, the first circle represents a time domain, and a length of the column bar represents a quantity of behaviors in a time period corresponding to the column bar. By combining the first circle and the column bar, distribution of the quantity of the behaviors in a time domain can be visually presented, thereby implementing visualization of spatiotemporal behavior data from a perspective of the time domain.

Optionally, in an embodiment, each piece of spatiotemporal behavior data in the spatiotemporal behavior data set further includes behavior data, and a behavior corresponding to the behavior data in each piece of spatiotemporal behavior data is one of M preset behaviors. The processor 610 may be further configured to determine, according to the behavior data in each piece of spatiotemporal behavior data, a behavior corresponding to each piece of spatiotemporal behavior data, and determine, according to the behavior corresponding to each piece of spatiotemporal behavior data, proportions of amounts of spatiotemporal behavior data that is respectively corresponding to the M behaviors to the amount of the spatiotemporal behavior data falling within the $i^{th}$ time period. The display 620 may be further configured to present, on the column bar, sub-line segments colored with different colors, where the different colors represent different behaviors in the M behaviors, and a length of the sub-line segment represents a proportion of an amount of spatiotemporal behavior data corresponding to a behavior represented by a color of the sub-line segment to the amount of the spatiotemporal behavior data falling within the $i^{th}$ time period.

Optionally, in an embodiment, the spatiotemporal behavior data set is a spatiotemporal behavior data set generated in a target region.

Optionally, in an embodiment, the processor 610 may be further configured to determine, according to the behavior corresponding to each piece of spatiotemporal behavior data in the spatiotemporal behavior data set, proportions of the spatiotemporal behavior data that is respectively corresponding to the M behaviors to the spatiotemporal behavior data set. The display 620 may be further configured to present, according to the proportions of the spatiotemporal behavior data that is respectively corresponding to the M behaviors, a second circle whose area is divided into M blocks, where the M blocks are respectively colored with the M colors, and an area of each block in the M blocks represents a proportion of spatiotemporal behavior data corresponding to a behavior represented by a color of the block to the spatiotemporal behavior data set.

Optionally, in an embodiment, the M blocks are separated in the second circle using Thiessen polygons.

Optionally, in an embodiment, the spatiotemporal behavior data set is a spatiotemporal behavior data set generated by a target user group in the network users. Each piece of spatiotemporal behavior data in the spatiotemporal behavior data set further includes location data. A location corresponding to the location data in each piece of spatiotemporal behavior data is distributed in K preset regions. The processor 610 may be further configured to determine, according to the location data in each piece of spatiotemporal behavior data in the spatiotemporal behavior data set, the location corresponding to each piece of spatiotemporal behavior data, and determine, according to the location corresponding to each piece of spatiotemporal behavior data, proportions of spatiotemporal behavior data that is respectively generated in the K regions to the spatiotemporal behavior data set. The display 620 may be further configured to present, according to the proportions of the spatiotemporal behavior data that is respectively generated in the K regions, a second circle including K blocks inside, where position distribution of the K blocks in the second circle is corresponding to position distribution of the K regions in space, and area sizes of the K blocks represent the proportions of the spatiotemporal behavior data that is respectively generated in the K regions to the spatiotemporal behavior data set.

Optionally, in an embodiment, the processor 610 may be further configured to determine, according to a behavior corresponding to spatiotemporal behavior data generated in a $j^{th}$ region in the K regions, proportions of the spatiotemporal behavior data that is respectively corresponding to the M behaviors to the spatiotemporal behavior data generated in the $j^{th}$ region, where j is any integer from 1 to K. The display 620 may be further configured to present, according to the proportions of the spatiotemporal behavior data that is respectively corresponding to the M behaviors to the spatiotemporal behavior data generated in the $j^{th}$ region, M sub-blocks in a block corresponding to the $j^{th}$ region, where the M sub-blocks are respectively colored with the M colors, and an area of each sub-block in the M sub-blocks represents a proportion of spatiotemporal behavior data corresponding to a behavior represented by a color of the sub-block to the spatiotemporal behavior data generated in the $j^{th}$ region.

Optionally, in an embodiment, the display 620 may be further configured to present a first legend, which is used to indicate a one-to-one correspondence between the M behaviors and the M colors.

Optionally, in an embodiment, the spatiotemporal behavior data set is a spatiotemporal behavior data set corresponding to a target behavior. Each piece of spatiotemporal behavior data in the spatiotemporal behavior data set further includes location data. A location corresponding to the location data in each piece of spatiotemporal behavior data belongs to one of K preset regions. The processor 610 may be further configured to determine, according to the location data in each piece of spatiotemporal behavior data in the spatiotemporal behavior data set, amounts of spatiotemporal behavior data that is in the spatiotemporal behavior data set and respectively generated in the K regions. A selecting unit is configured to select, from Z preset numerical intervals, a numerical interval to which the amounts of spatiotemporal behavior data that is respectively generated in the K regions belong. The display 620 may be further configured to present a second legend, where the second legend is used to indicate a one-to-one correspondence between the Z numerical ranges and Z colors, and present, according to the numerical interval to which the amounts of spatiotemporal behavior data that is respectively generated in the K regions belong, a map including the K regions, where in the map, each region in the K regions is colored with a color corresponding to a numerical interval to which an amount of spatiotemporal behavior data generated in the region belongs. The processor 610 may be further configured to determine, according to the location data in each piece of spatiotemporal behavior data, a location in which each piece of spatiotemporal behavior data is generated, and determine, according to the location corresponding to each piece of spatiotemporal behavior data, a proportion of an amount of spatiotemporal behavior data generated in each region set in the K regions to the amount of the spatiotemporal behavior data falling within the $i^{th}$ time period, where in the K regions, regions colored with a same color belong to a region set. The display 620 may be further configured to present, on the column bar, sub-line segments colored with different colors, where a length of the sub-line segment represents a proportion of an amount of spatiotemporal behavior data generated in a region set that is in the K regions and colored with a color of the sub-line segment to the amount of the spatiotemporal behavior data falling within the $i^{th}$ time period.

Optionally, in an embodiment, the K regions in the map are K expanded regions, and an expansion size of each region in the K regions is positively related to an amount of spatiotemporal behavior data that is in the spatiotemporal behavior data set and generated in the region.

Optionally, in an embodiment, the second circle has a same center as the first circle and is located inside the first circle.

Optionally, in an embodiment, the spatiotemporal behavior data set is a spatiotemporal behavior data set generated on a workday or a weekend. The N time periods are N time periods that are obtained by dividing one day of 24 hours. The different dots on the circumference line of the first circle are corresponding to different moments of one day of 24 hours. The dot corresponding to 0 o'clock is used as a start point, and moments corresponding to dots on the circumference line sequentially increase in a clockwise direction or a counterclockwise direction. The processor 610 is further configured to determine, according to the time point at which or the time period in which each piece of spatiotemporal behavior data is generated, an average amount of spatiotemporal behavior data per day that is in the spatiotemporal behavior data set and generated at the time point or in the time period falling within each time period in the N time periods.

Optionally, in an embodiment, the spatiotemporal behavior data set is the spatiotemporal behavior data set generated on a workday. The column bar uses the intersecting position of the column bar and the circumference line as a start point and extends in a direction away from the first circle. The processor 610 may be further configured to acquire another spatiotemporal behavior data set generated by the network users on a weekend. The apparatus may further include the processor 610, configured to determine, according to time data in each piece of spatiotemporal behavior data in another spatiotemporal behavior data set, a time point at which or a time period in which each piece of spatiotemporal behavior data in the other spatiotemporal behavior data set, is generated, determine, according to the time point at which or the time period in which each piece of spatiotemporal behavior data in the other spatiotemporal behavior data set, is generated, an average amount of spatiotemporal behavior data per day that is in the spatiotemporal behavior data set and generated at a time point or in a time period falling within each time period in the N time periods, and the display 620 may be further configured to present another column bar corresponding to a $k^{th}$ time period in the N time periods, where the other column bar is in a radial direction of the first circle and intersects the first circle. The other column bar uses an intersecting position of the other column bar and the circumference line as a start point and extends to an interior of the first circle. The intersecting position of the other column bar and the circumference line is located in a segment of circumference line that is on the circumference line and corresponding to the $k^{th}$ time period. A length of the other column bar represents an average amount of spatiotemporal behavior data falling within the $k^{th}$ time period per day, and k is any integer from 1 to N.

Optionally, in an embodiment, the spatiotemporal behavior data is check-in data on a social network.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A data visualization method, comprising:
    acquiring a spatiotemporal behavior data set generated by network users, wherein each piece of spatiotemporal behavior data in the spatiotemporal behavior data set comprises time data;
    determining, according to the time data in each piece of the spatiotemporal behavior data, a time point at which or a time period in which each piece of the spatiotemporal behavior data is generated;
    determining, according to the time point at which or the time period in which each piece of the spatiotemporal behavior data is generated, an amount of the spatiotemporal behavior data that is in the spatiotemporal behavior data set and generated at the time point or in the time period falling within each of N time periods, wherein the N time periods are N time periods that are formed by dividing one day of 24 hours, one week, or one month;
    presenting a first circle, wherein different dots on a circumference line of the first circle are corresponding to different time periods in one day of 24 hours, one week, or one month, wherein a dot corresponding to 0 o'clock is used as a start point, and wherein time periods corresponding to dots on the circumference line sequentially increase in a clockwise direction or a counterclockwise direction;
    presenting a column bar corresponding to an $i^{th}$ time period in the N time periods, wherein the column bar is in a radial direction of the first circle and intersects the first circle, wherein an intersecting position of the column bar and the circumference line of the first circle is located in a segment of circumference line that is on the circumference line and corresponding to the $i^{th}$ time period, wherein a length of the column bar represents the amount of the spatiotemporal behavior data that is in the spatiotemporal behavior data set and generated at the time point or in the time period falling within the $i^{th}$ time period, wherein i is any integer from 1 to N, wherein each piece of the spatiotemporal behavior data in the spatiotemporal behavior data set further comprises behavior data, and wherein a behavior corresponding to the behavior data in each piece of the spatiotemporal behavior data is one of M preset behaviors;
    determining, according to the behavior data in each piece of the spatiotemporal behavior data, the behavior corresponding to each piece of the spatiotemporal behavior data;
    determining, according to the behavior corresponding to each piece of the spatiotemporal behavior data, proportions of amounts of the spatiotemporal behavior data that is respectively corresponding to the M behaviors to the amount of the spatiotemporal behavior data generated at the time point or in the time period falling within the $i^{th}$ time period;
    presenting, on the column bar, sub-line segments colored with different colors, wherein the different colors represent different behaviors in the M behaviors, and wherein a length of the sub-line segment represents a proportion of the amount of spatiotemporal behavior data corresponding to the behavior represented by the color of the sub-line segment to the amount of the spatiotemporal behavior data falling within the $i^{th}$ time period; and
    providing the spatiotemporal behavior data set generated by the network users on a display of a computer using the first circle and the column bar to represent the spatiotemporal behavior data for data mining.

2. The method according to claim 1, wherein the spatiotemporal behavior data set is the spatiotemporal behavior data set generated in a target region.

3. The method according to claim 2, further comprising:
    determining, according to the behavior corresponding to each piece of the spatiotemporal behavior data in the spatiotemporal behavior data set, proportions of the spatiotemporal behavior data that is respectively corresponding to the M behaviors to the spatiotemporal behavior data set; and presenting, according to the proportions of the spatiotemporal behavior data that is respectively corresponding to the M behaviors, a second circle whose area is divided into M blocks, wherein the M blocks are respectively colored with M colors, and wherein an area of each block in the M blocks represents a proportion of the spatiotemporal behavior data corresponding to the behavior represented by a color of the block to the spatiotemporal behavior data set.

4. The method according to claim 3, wherein the M blocks are separated in the second circle using Thiessen polygons.

5. The method according to claim 3, wherein the second circle has a same center as the first circle and is located inside the first circle.

6. The method according to claim 1, wherein the spatiotemporal behavior data set is the spatiotemporal behavior data set generated by a target user group in the network users, wherein each piece of the spatiotemporal behavior data in the spatiotemporal behavior data set further comprises location data, wherein a location corresponding to the location data in each piece of the spatiotemporal behavior data is distributed in K preset regions, and wherein the method further comprises:

determining, according to the location data in each piece of the spatiotemporal behavior data in the spatiotemporal behavior data set, the location corresponding to each piece of the spatiotemporal behavior data;

determining, according to the location corresponding to each piece of the spatiotemporal behavior data, proportions of the spatiotemporal behavior data that is respectively generated in the K regions to the spatiotemporal behavior data set; and presenting, according to the proportions of the spatiotemporal behavior data that is respectively generated in the K regions, a second circle comprising K blocks, wherein position distribution of the K blocks in the second circle is corresponding to position distribution of the K regions in space, and wherein area sizes of the K blocks represent the proportions of the spatiotemporal behavior data that is respectively generated in the K regions to the spatiotemporal behavior data set.

7. The method according to claim 6, further comprising:

determining, according to the behavior corresponding to the spatiotemporal behavior data generated in a $j^{th}$ region in the K regions, the proportions of the spatiotemporal behavior data that is respectively corresponding to the M behaviors to the spatiotemporal behavior data generated in the $j^{th}$ region, wherein j is any integer from 1 to K; and presenting, according to the proportions of the spatiotemporal behavior data that is respectively corresponding to the M behaviors to the spatiotemporal behavior data generated in the $j^{th}$ region, M sub-blocks in a block corresponding to the $j^{th}$ region, wherein the M sub-blocks are respectively colored with M colors, and wherein an area of each of the M sub-blocks represents a proportion of the spatiotemporal behavior data corresponding to the behavior represented by a color of the sub-block to the spatiotemporal behavior data generated in the $j^{th}$ region.

8. The method according to claim 1, further comprising presenting a first legend, which is used to indicate a one-to-one correspondence between the M behaviors and M colors.

9. A data visualization method, comprising:

acquiring a spatiotemporal behavior data set generated by network users, wherein each piece of spatiotemporal behavior data in the spatiotemporal behavior data set comprises time data;

determining, according to the time data in each piece of the spatiotemporal behavior data, a time point at which or a time period in which each piece of the spatiotemporal behavior data is generated;

determining, according to the time point at which or the time period in which each piece of the spatiotemporal behavior data is generated, an amount of the spatiotemporal behavior data that is in the spatiotemporal behavior data set and generated at the time point or in the time period falling within each of N time periods, wherein the N time periods are N time periods that are formed by dividing one day of 24 hours, one week, or one month;

presenting a first circle, wherein different dots on a circumference line of the first circle are corresponding to different time periods in one day of 24 hours, one week, or one month, wherein a dot corresponding to 0 o'clock is used as a start point, and wherein time periods corresponding to dots on the circumference line sequentially increase in a clockwise direction or a counterclockwise direction;

presenting a column bar corresponding to an $i^{th}$ time period in the N time periods, wherein the column bar is in a radial direction of the first circle and intersects the first circle, wherein an intersecting position of the column bar and the circumference line of the first circle is located in a segment of circumference line that is on the circumference line and corresponding to the $i^{th}$ time period, wherein a length of the column bar represents the amount of the spatiotemporal behavior data that is in the spatiotemporal behavior data set and generated at the time point or in the time period falling within the $i^{th}$ time period, wherein i is any integer from 1 to N, wherein the spatiotemporal behavior data set is a spatiotemporal behavior data set corresponding to a target behavior, wherein each piece of the spatiotemporal behavior data in the spatiotemporal behavior data set further comprises location data, and wherein a location corresponding to the location data in each piece of the spatiotemporal behavior data belongs to one of K preset regions;

determining, according to the location data in each piece of the spatiotemporal behavior data in the spatiotemporal behavior data set, amounts of the spatiotemporal behavior data that is in the spatiotemporal behavior data set and respectively generated in the K regions;

selecting, from Z preset numerical intervals, a numerical interval to which the amounts of the spatiotemporal behavior data that is respectively generated in the K regions belong;

presenting a second legend, wherein the second legend is used to indicate a one-to-one correspondence between the Z numerical intervals and Z colors;

presenting, according to the numerical interval to which the amounts of the spatiotemporal behavior data that is respectively generated in the K regions belong, a map comprising the K regions, wherein in the map, each of the K regions is colored with a color corresponding to the numerical interval to which the amount of the spatiotemporal behavior data generated in the region belongs;

determining, according to the location data in each piece of the spatiotemporal behavior data, the location in which each piece of the spatiotemporal behavior data is generated;

determining, according to the location corresponding to each piece of the spatiotemporal behavior data, a proportion of the amount of the spatiotemporal behavior data generated in each region set in the K regions to the amount of the spatiotemporal behavior data falling within the $i^{th}$ time period, wherein in the K regions, regions colored with a same color belong to a region set;

presenting, on the column bar, sub-line segments colored with different colors, wherein a length of the sub-line segment represents the proportion of the amount of the spatiotemporal behavior data generated in the region set that is in the K regions and colored with a color of the sub-line segment to the amount of the spatiotemporal behavior data falling within the $i^{th}$ time period; and providing the spatiotemporal behavior data set generated by the network users on a display of a computer using the first circle and the column bar to represent the spatiotemporal behavior data for data mining.

10. The method according to claim 9, wherein the K regions in the map are K expanded regions, and wherein an expansion size of each of the K regions is positively related to the amount of the spatiotemporal behavior data that is in the spatiotemporal behavior data set and generated in the region.

11. A data visualization method, comprising:

acquiring a spatiotemporal behavior data set generated by network users, wherein each piece of spatiotemporal behavior data in the spatiotemporal behavior data set comprises time data;

determining, according to the time data in each piece of the spatiotemporal behavior data, a time point at which or a time period in which each piece of the spatiotemporal behavior data is generated;

determining, according to the time point at which or the time period in which each piece of the spatiotemporal behavior data is generated, an amount of the spatiotemporal behavior data that is in the spatiotemporal behavior data set and generated at the time point or in the time period falling within each of N time periods, wherein the N time periods are N time periods that are formed by dividing one day of 24 hours, one week, or one month;

presenting a first circle, wherein different dots on a circumference line of the first circle are corresponding to different time periods in one day of 24 hours, one week, or one month, wherein a dot corresponding to 0 o'clock is used as a start point, and wherein time periods corresponding to dots on the circumference line sequentially increase in a clockwise direction or a counterclockwise direction;

presenting a column bar corresponding to an $i^{th}$ time period in the N time periods, wherein the column bar is in a radial direction of the first circle and intersects the first circle, wherein an intersecting position of the column bar and the circumference line of the first circle is located in a segment of circumference line that is on the circumference line and corresponding to the $i^{th}$ time period, wherein a length of the column bar represents the amount of the spatiotemporal behavior data that is in the spatiotemporal behavior data set and generated at the time point or in the time period falling within the $i^{th}$ time period, wherein i is any integer from 1 to N, wherein the spatiotemporal behavior data set is the spatiotemporal behavior data set generated on a workday or a weekend, wherein the N time periods are N time periods that are obtained by dividing one day of 24 hours, wherein the different dots on the circumference line of the first circle are corresponding to different moments of one day of 24 hours, wherein the dot corresponding to 0 o'clock is used as the start point, wherein the moments corresponding to dots on the circumference line sequentially increase in the clockwise direction or the counterclockwise direction, and wherein determining, according to the time point at which or the time period in which each piece of the spatiotemporal behavior data is generated, the amount of the spatiotemporal behavior data that is in the spatiotemporal behavior data set and generated at the time point or in the time period falling within each time period in N time periods comprises determining, according to the time point at which or the time period in which each piece of the spatiotemporal behavior data is generated, an average amount of the spatiotemporal behavior data per day that is in the spatiotemporal behavior data set and generated at the time point or in the time period falling within each time period in the N time periods, wherein the spatiotemporal behavior data set is the spatiotemporal behavior data set generated on the workday, and wherein the column bar uses the intersecting position of the column bar and the circumference line as a start point and extends in a direction away from the first circle;

acquiring another spatiotemporal behavior data set generated by the network users on the weekend;

determining, according to time data in each piece of the spatiotemporal behavior data in the other spatiotemporal behavior data set, a time point at which or a time period in which each piece of the spatiotemporal behavior data in the other spatiotemporal behavior data set is generated;

determining, according to the time point at which or the time period in which each piece of the spatiotemporal behavior data in the other spatiotemporal behavior data set is generated, the average amount of the spatiotemporal behavior data per day that is in the other spatiotemporal behavior data set and generated at the time point or in the time period falling within each time period in the N time periods;

presenting another column bar corresponding to a $k^{th}$ time period in the N time periods, wherein the other column bar is in the radial direction of the first circle and intersects the first circle, wherein the other column bar uses an intersecting position of the other column bar and the circumference line as the start point and extends to an interior of the first circle, wherein the intersecting position of the other column bar and the circumference line is located in a segment of the circumference line that is on the circumference line and corresponding to the $k^{th}$ time period, wherein the length of the other column bar represents the average amount of the spatiotemporal behavior data per day generated at the time point or in the time period falling within the $k^{th}$ time period, and wherein k is any integer from 1 to N; and providing the spatiotemporal behavior data set generated by the network users on a display of a computer using the first circle and the column bar to represent the spatiotemporal behavior data for data mining.

12. The method according to claim 11, wherein the spatiotemporal behavior data is check-in data on a social network.

13. A data visualization apparatus, comprising:
a display; and
a processor coupled to the display and configured to:
acquire a spatiotemporal behavior data set generated by network users, wherein each piece of spatiotemporal behavior data in the spatiotemporal behavior data set comprises time data;
determine, according to the acquired time data in each piece of the spatiotemporal behavior data, a time point at which or a time period in which each piece of the spatiotemporal behavior data is generated;
determine, according to the determined time point or the time period at which or in which each piece of the spatiotemporal behavior data is generated, an amount of the spatiotemporal behavior data that is in the spatiotemporal behavior data set and generated at the time point or in the time period falling within each time period in N time periods, wherein the N time periods are N time periods that are obtained by dividing one day of 24 hours, one week, or one month,
wherein the display is configured to:
present a first circle, wherein different dots on a circumference line of the first circle are corresponding to different time periods in one day of 24 hours, one week, or one month, wherein a dot corresponding to 0 o'clock is used as a start point, and wherein the time periods corresponding to dots on the circumference line sequentially increase in a clockwise direction or a counterclockwise direction; and
present a column bar corresponding to an $i^{th}$ time period in the N time periods, wherein the column bar is in a radial direction of the first circle and intersects the first circle, wherein an intersecting position of the column bar and the circumference line is located in a segment of circumference line that is on the circumference line and corresponding to the $i^{th}$ time period, wherein a length of the column bar represents the amount of the spatiotemporal behavior data that is in the spatiotemporal behavior data set and generated at the time point or in the time period falling within the $i^{th}$ time period, wherein i is any integer from 1 to N, wherein each piece of the spatiotemporal behavior data in the spatiotemporal behavior data set further comprises behavior data, and wherein a behavior corresponding to the behavior data in each piece of the spatiotemporal behavior data is one of M preset behaviors;
determine, according to the behavior data in each piece of the spatiotemporal behavior data, the behavior corresponding to each piece of the spatiotemporal behavior data;
determine, according to the behavior corresponding to each piece of the spatiotemporal behavior data, proportions of amounts of the spatiotemporal behavior data that is respectively corresponding to the M behaviors to the amount of the spatiotemporal behavior data falling within the $i^{th}$ time period, wherein the display is further configured to present, on the column bar, sub-line segments colored with different colors, wherein the different colors represent different behaviors in the M behaviors, and wherein a length of the sub-line segment represents a proportion of the amount of the spatiotemporal behavior data corresponding to the behavior represented by a color of the sub-line segment to the amount of the spatiotemporal behavior data falling within the $i^{th}$ time period; and
provide the spatiotemporal behavior data set generated by the network users on the display using the first circle and the column bar to represent the spatiotemporal behavior data for data mining.

14. The apparatus according to claim 13, wherein the spatiotemporal behavior data set is the spatiotemporal behavior data set generated in a target region.

15. The apparatus according to claim 14, wherein the processor is further configured to determine, according to the behavior corresponding to each piece of the spatiotemporal behavior data in the spatiotemporal behavior data set, proportions of the spatiotemporal behavior data that is respectively corresponding to the M behaviors to the spatiotemporal behavior data set, wherein the display is further configured to present, according to the proportions of the spatiotemporal behavior data that is respectively corresponding to the M behaviors, a second circle whose area is divided into M blocks, wherein the M blocks are respectively colored with M colors, and wherein an area of each block in the M blocks represents a proportion of the spatiotemporal behavior data corresponding to the behavior represented by a color of the block to the spatiotemporal behavior data set.

16. The apparatus according to claim 15, wherein the M blocks are separated in the second circle using Thiessen polygons.

17. The apparatus according to claim 13, wherein the spatiotemporal behavior data set is the spatiotemporal behavior data set generated by a target user group in the network users, wherein each piece of the spatiotemporal behavior data in the spatiotemporal behavior data set further comprises location data, wherein a location corresponding to the location data in each piece of the spatiotemporal behavior data is distributed in K preset regions, wherein the processor is further configured to:
determine, according to the location data in each piece of the spatiotemporal behavior data in the spatiotemporal behavior data set, the location corresponding to each piece of the spatiotemporal behavior data; and
determine, according to the location corresponding to each piece of the spatiotemporal behavior data, proportions of spatiotemporal behavior data that is respectively generated in the K regions to the spatiotemporal behavior data set,
wherein the display is further configured to present, according to the proportions of the spatiotemporal behavior data that is respectively generated in the K regions, a second circle comprising K blocks inside,
wherein position distribution of the K blocks in the second circle is corresponding to position distribution of the K regions in space, and
wherein area sizes of the K blocks represent the proportions of the spatiotemporal behavior data that is respectively generated in the K regions to the spatiotemporal behavior data set.

* * * * *